United States Patent [19]

Moseley et al.

[11] Patent Number: 4,571,139

[45] Date of Patent: * Feb. 18, 1986

[54] SELF-PROPELLED FREIGHT HANDLING TRUCK

[75] Inventors: John F. Moseley, Ormond Beach, Fla.; Stephen R. Austin, Winnetka, Ill.

[73] Assignee: Superior Handling Equipment, Inc., Ormond Beach, Fla.

[*] Notice: The portion of the term of this patent subsequent to Mar. 6, 2001 has been disclaimed.

[21] Appl. No.: 491,019

[22] Filed: May 3, 1983

Related U.S. Application Data

[63] Continuation-in-part of Ser. No. 295,783, Aug. 24, 1981, Pat. No. 4,435,113.

[51] Int. Cl.⁴ ................................................ B66F 9/08
[52] U.S. Cl. ..................................... 414/347; 414/467; 280/638; 187/9 R; 180/209
[58] Field of Search ............... 414/346, 347, 460, 467, 414/498, 592, 622, 629, 631, 634, 635, 785, 639–642, 787, 537, 462; 280/638; 212/73, 75; 187/9 R; 180/65.1; 410/30

[56] References Cited

U.S. PATENT DOCUMENTS

| | | | |
|---|---|---|---|
| 3,088,608 | 5/1963 | Theodore | 212/75 X |
| 3,190,994 | 6/1965 | Becker et al. | 180/65.1 X |
| 3,302,810 | 2/1967 | Heidrick | 414/629 |
| 3,388,820 | 6/1968 | Lebre | 414/460 |
| 3,390,797 | 7/1968 | Goodacre et al. | 414/467 |
| 3,554,385 | 1/1971 | Munck | 212/73 X |
| 3,567,054 | 3/1971 | Emke | 414/785 X |
| 3,616,953 | 11/1971 | Shaffer et al. | 414/631 |
| 3,695,471 | 10/1972 | Rivers, Jr. | 414/498 |
| 4,061,237 | 12/1977 | Austin et al. | 414/592 X |
| 4,180,363 | 12/1979 | Steiger et al. | 414/498 X |
| 4,354,795 | 10/1982 | Dutra, Jr. | 414/622 |
| 4,396,341 | 8/1983 | Brouwer et al. | 414/467 |
| 4,435,113 | 3/1984 | Mosely et al. | 414/347 |

FOREIGN PATENT DOCUMENTS

2359418 6/1975 Fed. Rep. of Germany ...... 414/467

Primary Examiner—Joseph E. Valenza
Assistant Examiner—David A. Bucci
Attorney, Agent, or Firm—Arthur G. Yeager

[57] ABSTRACT

A system in which a self-propelled fork lift truck that is collapsible to a compact structure for storage is made transportable on a highway freight handling truck, by lifting itself into an enclosed bay of the highway truck, or onto a platform attached to the highway truck, or onto a trailer pulled by the highway truck.

13 Claims, 25 Drawing Figures

SELF-PROPELLED FREIGHT HANDLING TRUCK

RELATED APPLICATIONS

This is a continuation-in-part of patent application Ser. No. 295,783, filed Aug. 24, 1981, now U.S. Pat. No. 4,453,113.

BACKGROUND OF THE INVENTION

Forklift trucks are well-known devices for moving and stacking large quantities of light or heavy materials. Forklift trucks may be of the counterbalanced or straddle-leg design and usually are large enough to carry a driver and move about in all types of warehouse and manufacturing areas. For a few specialized purposes forklift trucks have been miniaturized and carried on a highway transport truck by hanging from the rear of the truck or carried inside the cargo space of a rear-loading truck. In U.S. Pat. No. 3,799,379 and U.S. 4,180,363, there are shown forklift trucks that can attach their lifting forks to stirrups on the bed of a transport truck, lift themselves off the ground up to the truck bed, and be secured in that position for highway transport to any location. In U.S. Pat. No. 4,061,237, there is shown a collapsible forklift truck that can lift itself into a transport truck and be stored in a folded state inside the truck. While these forklift trucks are usable for many purposes, they are not appropriate for tasks such as unloading entire or partial pallet loads from a side-loading freight truck, such as a beverage truck, and moving those unit loads of freight on pallets through narrow doors, hallways, and crowded aisles to the inside of congested stores. Previously, this task was accomplished with much manual labor and usually no powered self-propelled equipment. Forklift trucks have not been made of such a size, weight, and configuration that they can carry a full pallet load readily through an ordinary door slightly larger than a pallet load in width, while being able to set the pallet down on the floor between the straddled front wheels, and yet, when stored out of use, be made sufficiently compact to be carried within the area of a single pallet in one bay of a side-loading highway truck. Delivery of cases of beverage from a truck parked outside a delivery building to inside storage areas or directly to sales areas involves special problems that could be greatly alleviated by the assistance of any self-propelled equipment with the before-mentioned characteristics.

It is an object of this invention to provide a small, collapsible forklift truck that is self-propelled, can be transported in a collapsed condition along with the highway truck, and in a few moments can be made available to unload and transport freight from the truck into a building, or transport freight from the building and load it into the highway truck. It is another object of the invention to provide a forklift truck which is self-propelled and which can, while moving with or without a transported load, spread its front wheels apart in preparation for setting a load on the floor or close the front wheels inward under the load area when it is necessary to pass through a narrow opening, such as a door, hall way, or aisle which is only slightly wider than the width of the unitized load being transported. Still other objects will appear from a more detailed description of this invention which follows.

BRIEF SUMMARY OF THE INVENTION

This invention provides a collapsible, self-propelled freight handling truck comprising a frame mounted on at least three wheels and supporting a mast, lifting forks, a motor to supply power, a tiller for guiding said wheels, and controls for selectively directing said power to the functional components of said truck; said wheels including at least one driving wheel powered by said motor, and at least two driven wheels mounted respectively on two horizontally pivotable arms; said tiller providing means for manually guiding said truck and including manually operated controls to propel said truck forward or reverse, to stop the movement of said truck, to raise, lower, or tilt said lifting forks, to spread or close said pivotable wheel arms, and to extend or retract said two driven wheels; said tiller and said lifting forks being separately foldable to collapse against said frame for storage of said truck. In one specific embodiment of this invention, a foldable horizontal surface is mounted above said lifting forks to provide a clamping means against which said fork can clamp and stabilize material carried on the forks.

This invention also provides a freight transport system comprising a highway traveling truck for transporting interiorly thereof, a driver, packaged freight, and a self-propelled freight handling forklift truck for transporting packages of freight from said highway traveling truck into a building or from the building to the highway traveling truck, including means for transporting said self-propelled forklift truck in a collapsed condition, along with said highway truck, said self-propelled forklift truck including foldable lifting forks mounted on a wheeled frame supporting a foldable tiller arm for guiding said forklift truck, power means for propelling said forklift truck, for raising, lowering, and tilting said lifting forks, and for expanding and narrowing the spacing between the wheels adjacent said lifting forks.

BRIEF DESCRIPTIONS OF THE DRAWINGS

The novel features believed to be characteristic of this invention are set forth with particularity of the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

In FIGS. 1-4 there are shown the details of the self-propelled freight handling truck of this invention. The truck includes a body 10 to which is attached a mast 11 and wheels 20 and 21. Lifting forks 13 are mounted on mast 11 such that they may be raised or lowered in the manner well-known of forklift trucks in general. Motor 12 is attached to mast 11 and is of the appropriate size, power, and connections to propel the truck and to operate all of the power driven parts thereof. Motor 12 preferably is an internal combustion engine, such a 2-cylinder Briggs & Stratton vertical shaft engine of 16-18 H.P. Such an engine can be operated on any normal hydrocarbon fuel such as gasoline, propane, or alcohol-modified hydrocarbon fuels.

The truck of this invention is guided and its speed is regulated through power handle 15 which is a tiller control means. The truck of this invention is intended to be driven by a person who walks along with the truck guiding and controlling it through power handle 15. In the embodiment shown in this invention, power handle 15 is connected directly to a single driving wheel 20 which is guided by moving handle 15 in any horizontal direction between the positions shown at 29. Handle grips 31 are rotatable manually and are connected electrically to the hydraulic drive unit similar in operation to the handle grips of electric power pallet jacks. The rotation of handle grips 31 in one direction gradually increases hydraulic pressure to driving wheel 20 producing driving movement in one direction, and when the handle grip is twisted in the reverse direction driving movement of wheel 20 is produced in the opposite direction. There is also a control incorporated into handle grips 31 to function as a brake so that the movement of wheel 20 in driving the truck of this invention may be slowed or brought to a stop in accordance with the desires of the driver by twisting handle grip 31 to the neutral position. The driving system of this truck incorporates a "dead man" brake such that when there is no pressure whatsoever on handle grip 31 to drive the unit forward or reverse, the handle grip will automatically return to the neutral position and the brake will be fully applied to prevent any movement of the truck. As the twist grip is rotated to move the truck in the forward or reverse directions the brake is correspondingly released as increased power is applied to the drive wheel and the truck is able to be propelled by the power directed to wheel 20.

The truck is also provided with two movable straddle wheels 21 attached to legs 46 which can be telescopically extended forward to move the wheels to the position shown at 22, and legs 46 can also be expanded to a wider straddle position as shown at 28. The extension or retraction of wheels 22 and the spreading or closing of legs 46 can be accomplished while the truck is standing still or while it is moving forward or backward with or without a load of freight. These positions of legs 46 permit the truck to be collapsed to a small volume for storage, or they permit the truck to be expanded into a position for lowering and lifting materials of various sorts to and from the floor between legs in position 28. Wheels 21 are idler wheels which have no connection to the power developed by motor 12 as compared to driving wheel 20 which is directly connected to such power by any suitable power transmission means. Legs 46 are attached to body 10 by pivot pins 47.

Mast 11 includes two vertical guide rails 48 and a carriage 49 which moves vertically on rails 48 and to which are attached forks 13 and top clamp 14. Guide rails 48 are pivoted at 50 by pins attached to body 10. Top clamp 14 provides an opposing surface against which a load on forks 13 can be clamped. Such a feature obviously provides a security against dropping material carried on forks 13 while being transported from one place to another. Preferably, top clamp 14 has a layer 33 of resilient material which will provide a more positive and secure clamping and stabilizing surface against which most freight, including bottles or cans of beverage, can be clamped and stabilized. Top clamp 14 is attached to carriage 49 by a screw device or a hydraulic cylinder to provide vertical adjustment relative to forks 13. The attachment is not shown here in order to simplify the drawings because such attachments for top clamps are well known today.

The movement of the various components of the truck of this invention is preferably controlled by a plurality of hydraulic pistons and cylinders and a series of control levers 16 for these pistons and cylinders. Cylinder 23 is provided to tilt mast 11 forward and backward about pivots 50 between the positions generally shown at 44. Double cylinder 30 performs the functions of widening or narrowing the amount of wheel straddle, i.e., between positions 21 and 28. A pair of cylinders 24 are provided to extend or retract legs 46 and wheels 21, i.e., between positions 22 and 21. Cylinder 32 is employed to raise and lower carriage 49 to any desired position, generally giving forks 13 a travel of at least about 40 inches. The controls for these cylinders are shown schematically at 16 as levers for activating various cylinders along with the necessary instrumentation to check the operability of the system, with buttons and switches to operate and safeguard the various components. Drive wheel 20 may be driven by any suitable power means transmitted from motor 12. A preferred arrangement is a hydraulic motor 51 driving a sprocket and chain drive 52 attached to wheel 20 and mounted in a yoke 53 that, in turn is connected to tiller power handle 15. A disc brake 54 operates against the sprocket on wheel 20 to provide braking power. Hydraulic connections are not shown in order to simplify the drawings. The hydraulic system includes a reservoir of hydraulic fluid, preferably oil, located in body 10 and in available hollow spaces in the frame and mast, with the necessary hoses, lines, valves, and pump to provide the pressure at whatever location is needed as desired by the driver. These associated items of equipment are not shown in these drawings since they are conventional in hydraulic fluid apparatus. Body 10 is built onto a rigid frame of suitable size and design to support the entire mechanism.

In order to reduce the physical size of the truck for minimum volume storage purposes, its various components are designed to be foldable. Handle 15 is foldable along path 19 to position 27 when it is not needed for control purposes. Forks 13 may be folded along path 18 to position 26 when they are not needed. Top clamp 14 and its supporting structure may be folded along path 17 to the position shown at 25 when it is not needed, e.g., when not used or when the truck is to be stored. It has already been mentioned that wheels 21 may be closed inward toward each other and also retracted to position 21.

Figure 1:
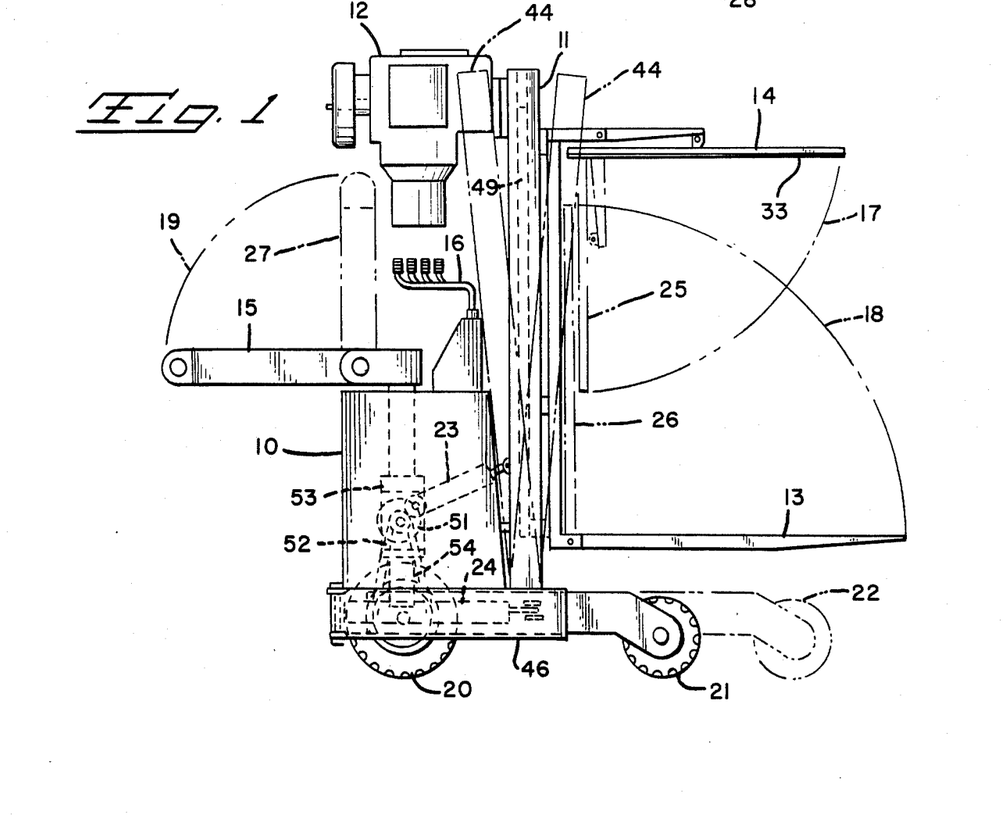
FIG. 1 is a side elevation view of the forklift truck of this invention.
Figure 2:
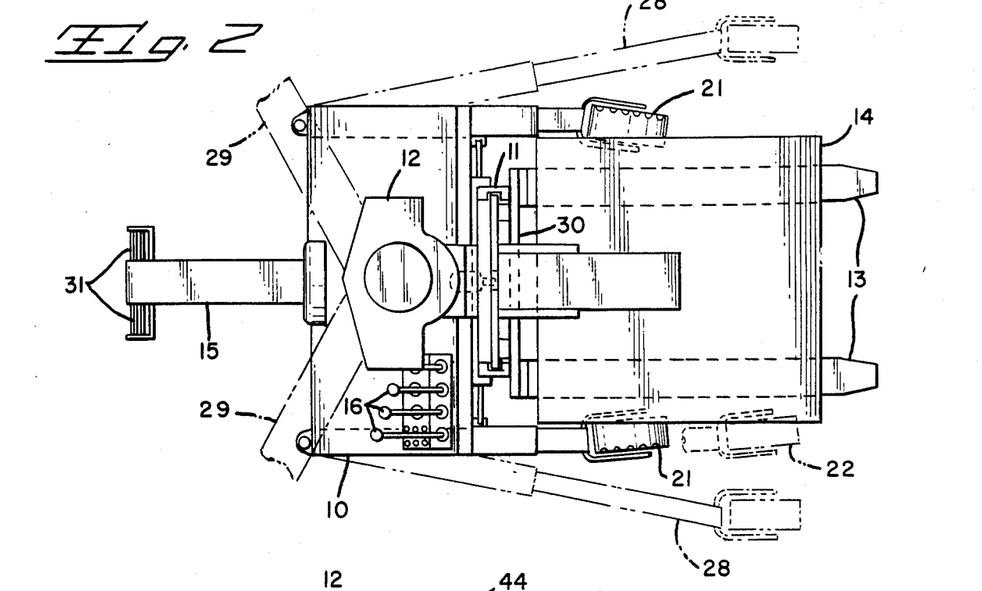
FIG. 2 is a top plan view of the forklift truck of this invention.
Figure 3:
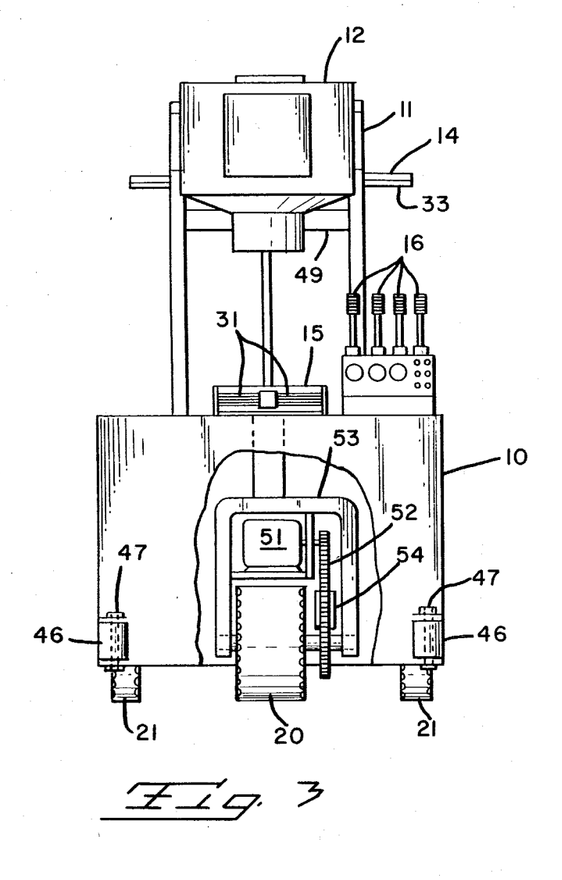
FIG. 3 is a rear elevation view of the forklift truck of this invention.
Figure 4:
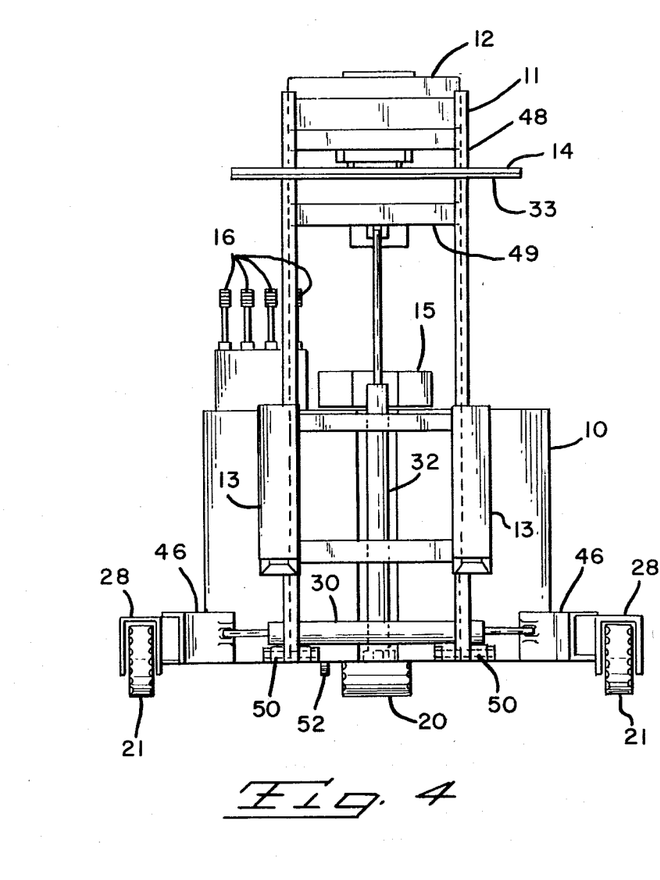
FIG. 4 is a front elevation view of the forklift truck of this invention.
Figure 5:
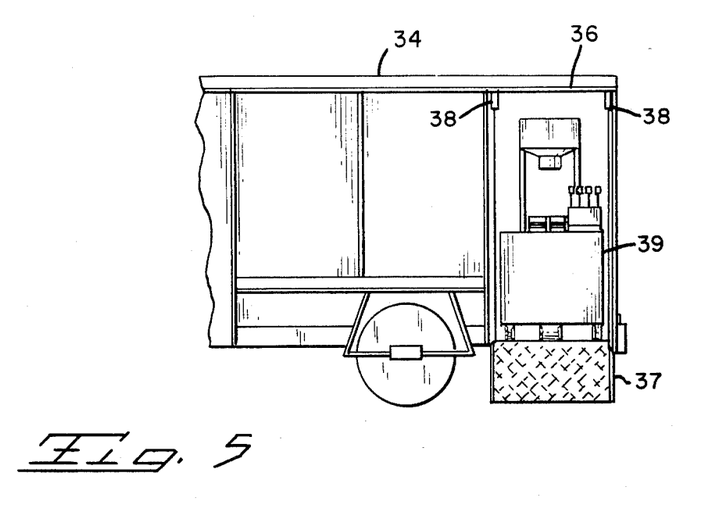
FIG. 5 is a partial view of one embodiment of the freight handling system of this invention involving a freight handling truck and the forklift truck of the invention mounted therein.
Figure 6:
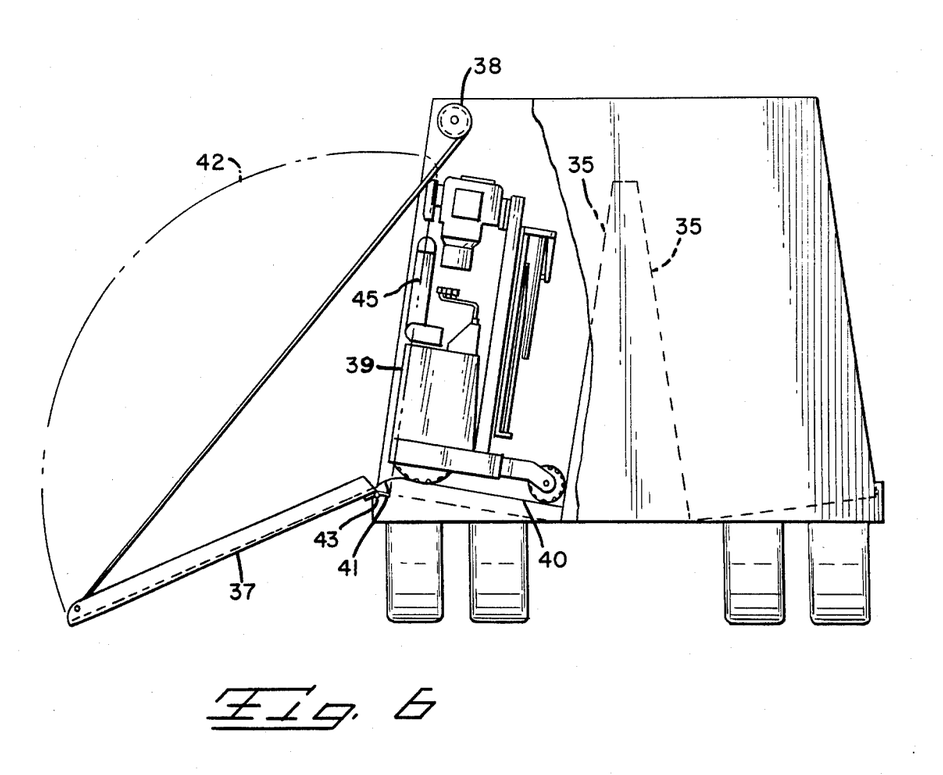
FIG. 6 is a rear view of the freight handling truck of FIG. 5 with the forklift truck mounted therein.

In FIGS. 5 and 6, there may be seen one embodiment in which the truck of this invention is stored and carried in a bay on a side-loading beverage delivery truck. Truck 34 has a standard bay or compartment 36 which is modified to carry the self-propelled truck 39 in its folded collapsed condition. In the normal beverage truck the bays are tilted inwardly as shown at 35 so that the beverage containers will angle toward the center of the truck and will not shift during transport or fall out of the truck when the doors to the bays or compartments are opened. The floor of bay 36 is built up slightly as shown at 40 and curved at its outward end 41 to permit the folded truck 39 to roll smoothly to or from floor 40 to ramp 37 without catching any of the undercarriage of truck 39.

Ramp 37 is hinged at 43 to the bottom of bay 36 to provide a storage position for ramp 37 and to serve as a means to retain the collapsed truck 39 inside bay 36 when ramp 37 is folded to position 45 along path 42 by the action of winch 38. When it is desired to remove truck 39 from beverage truck 34 it is only necessary for the driver to drop ramp 37 to the position shown in FIG. 6, start the motor of the collapsed truck 38, pull handle 15 down to its operating position, and allow the truck 39 to roll down ramp 37 under its self-propelled power. Wheels 21 can then be extended to position 22 or 28, forks 13 can be unfolded and raised as desired to unload beverage pallet loads directly from bays of truck 34 and thus save a considerable amount of manual labor and time normally expended in unloading individual cases from truck 34. When truck 39 is loaded, it can then be led or followed by the driver to its destination, normally inside a building. Returning with empties or a partial pallet load, the driver may lead truck 39 or follow it, whichever suits him best in guiding the forklift truck 39 back to the truck 34. As the driver approaches a doorway, hallway, or narrow aisle it may be necessary for him to cause the straddle wheels to be narrowed to position 22 to pass through the available space and then later to expand those straddle wheels to position 28 to permit placing the load on the floor between them. These movements of the straddle wheels may be accomplished while the vehicle is moving by simply activating the appropriate control lever 16 for hydraulic cylinder 30. Such flexibility is greatly to be desired in handling materials, such as unitized cases of beverage, as they are moved from a truck in the street or parking lot into a store.

In FIGS. 7-15 there may be seen another embodiment in which the truck of this invention is stored and carried in a bay on a side-loading beverage delivery truck. Truck 34 has a standard bay or compartment 36 which is modified to carry the self-propelled truck 39 in its folded collapsed condition. Inside of bay 36 there is constructed a framework 55 which is capable of supporting forklift truck 39 from hook means 56 while forklift truck 39 lifts itself to the level of bay 36 and moves into bay 36, and framework 55 collapses on itself to be wholly within the outline 57 of beverage delivery truck 34.

Framework 55 can be constructed of any suitable material and made in any suitable design to accomplish the purposes set forth herein. A preferred construction comprises steel beams in the shape of angles, channels, etc. In the design shown in this embodiment (FIGS. 7-9) two upright angle members 58 are fastened to the interior corners of bay 36 by suitable bolts or screws 59, and two angle members 60 are attached to the lower corners of floor 61 of bay 36 by suitable bolts or screws 62. Stiffening connections 63 are attached to members 58 and 60 to form a triangular connection as is well known in the art. Cross members 64 and 97 join members 58 and 60 horizontally respectively near the tops and bottoms of members 58 and 60. The framework 55 just described is fixed to the interior of bay 36 and is immovable.

Figure 7:
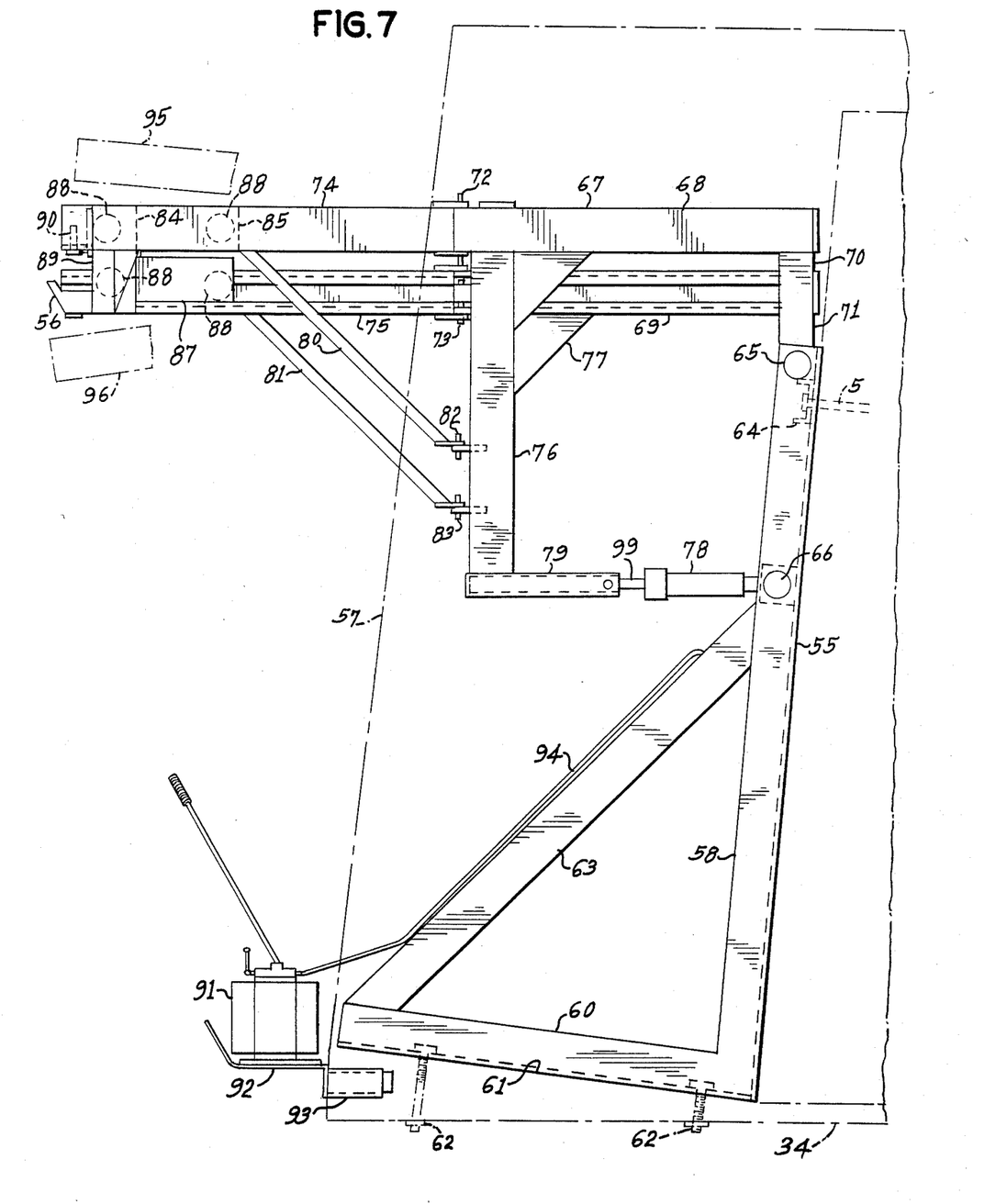
FIG. 7 is a side elevation view of another embodiment of the
system of this invention. freight handling
Figure 8:
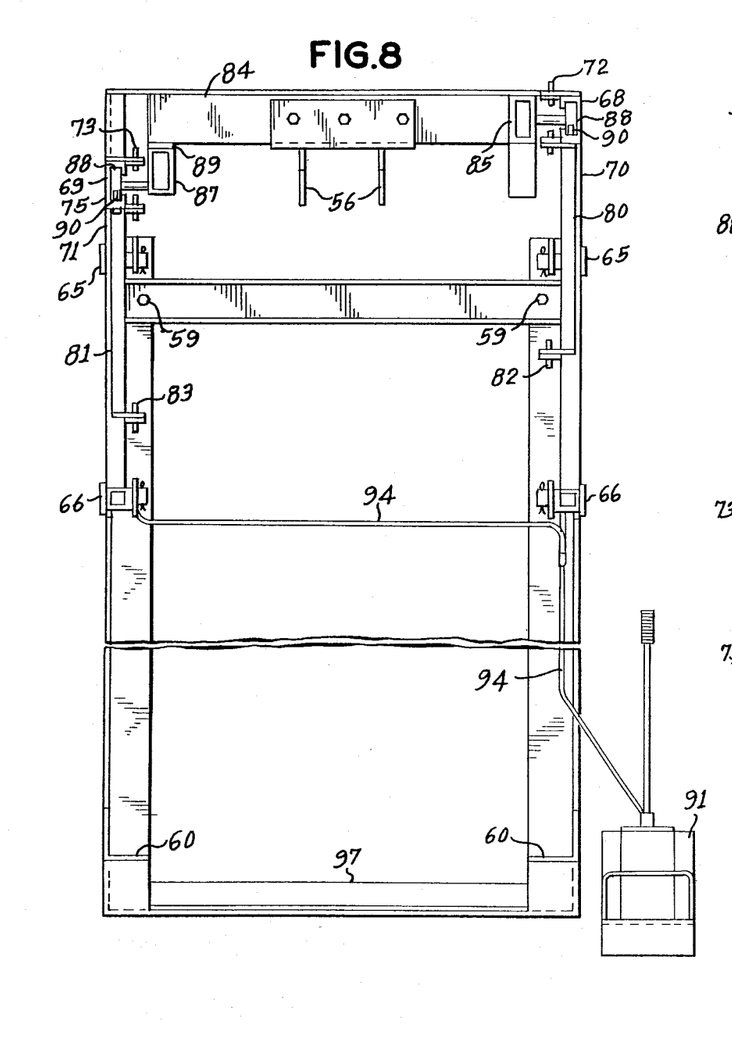
FIG. 8 is a front elevation view of the embodiment of FIG. 7.
Figure 9:
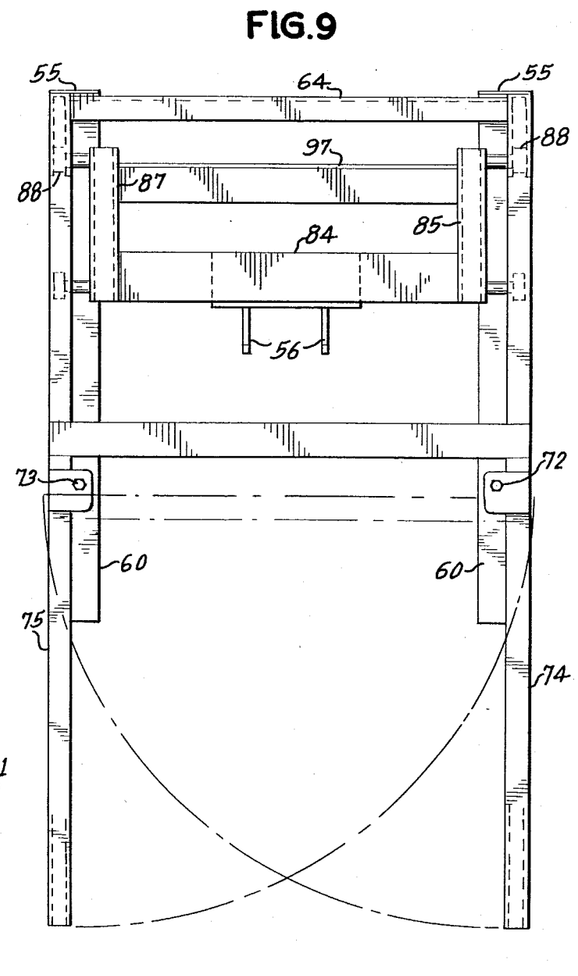
FIG. 9 is a top plan view of the embodiment of FIG. 7.

Attached to framework 55 by upper pivot pins 65 and lower pivot pins 66 is movable framework 67. Framework 67 consists of horizontal channels 68 and 69 connected to upper pivot pins 65 by vertical legs 70 and 71, respectively. Channels 68 and 69 are each two separate channels connected end-to-end by hinges 72 and 73, respectively, so that outer arms 74 and 75 of channels 68 and 69 can fold toward each other when it is desired to store them inside the outline 57 of truck 34. Depending downwardly from the inner portions of channels 68 and 69 are supports 76 and gusset plates 77 to stiffen supports 76 in a fixed position with respect to channels 68 and 69. At the bottom of supports 76 there is attached a hydraulic cylinder 78 which is connected to lower pivot pin 66 and to whatever length of extension arm 79 that may be needed to connect cylinder 78 with support 76. In order to provide a stiffening support for the folding of outer arms 74 and 75, each is fitted with an angle support member 80 and 81, and lower hinges 82 and 83, respectively.

Cross bar 84 has affixed to its central portion one or more hook member 56 which are so designed and located as to be readily attachable to the upper cross member of mast 11 of forklift truck 39. The design shown in FIGS. 7-9 includes two hook members 56 which are positioned so as to fit the inside corners of crossbar 86 of mast 11 (as seen best in FIG. 14). Crossbar 84 is fixed at each end to a trolley member 85 and 87 mounted on rollers 88 to traverse the length of channels 68 and 69. Since outer arms 74 and 75 must be foldable inwardly for storage purposes they are preferably mounted at different elevations from the floor 61 of truck 34, and this necessitates the use of support leg 89 to join trolley member 87 on outer arm 75 with crossbar 84. Stop members 90 are positioned to prevent rollers 88 from moving out of the track of the channels in outer arms 74 and 75.

A hand operated hydraulic pump 91 is removably positioned in saddle 92 affixed to the outside of truck 34 through a pin connector 93 fitting into socket 98 attached to truck 34. Pump 91 is connected through flexible lines 94 to hydraulic cylinders 78. Pump 91 is employed to provide suitable pressure to extend the piston rod in cylinder 78 causing movable framework 67 to raise or lower outer arms 74 and 75 to any positioned between those shown at 95 and 96. These positions permit the forklift truck 39 when hanging from hook members 56 to roll into bay 36 for storage, or out of bay 36 when it is needed for use.

Figure 10:
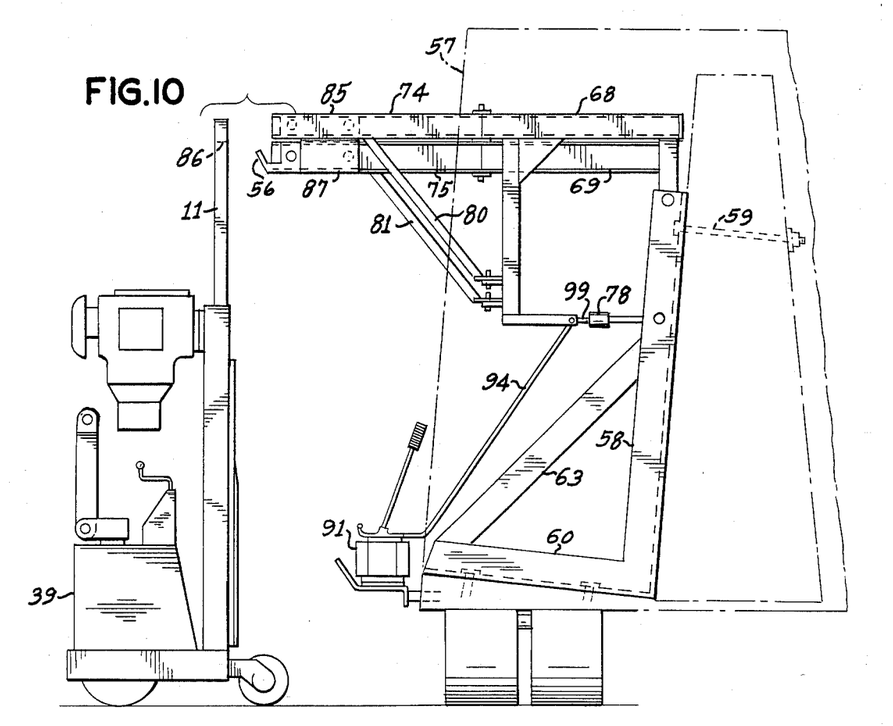
FIG. 10 is a side elevation view of the embodiment of FIG. 7 with the forklift truck ready for storage.
Figure 11:
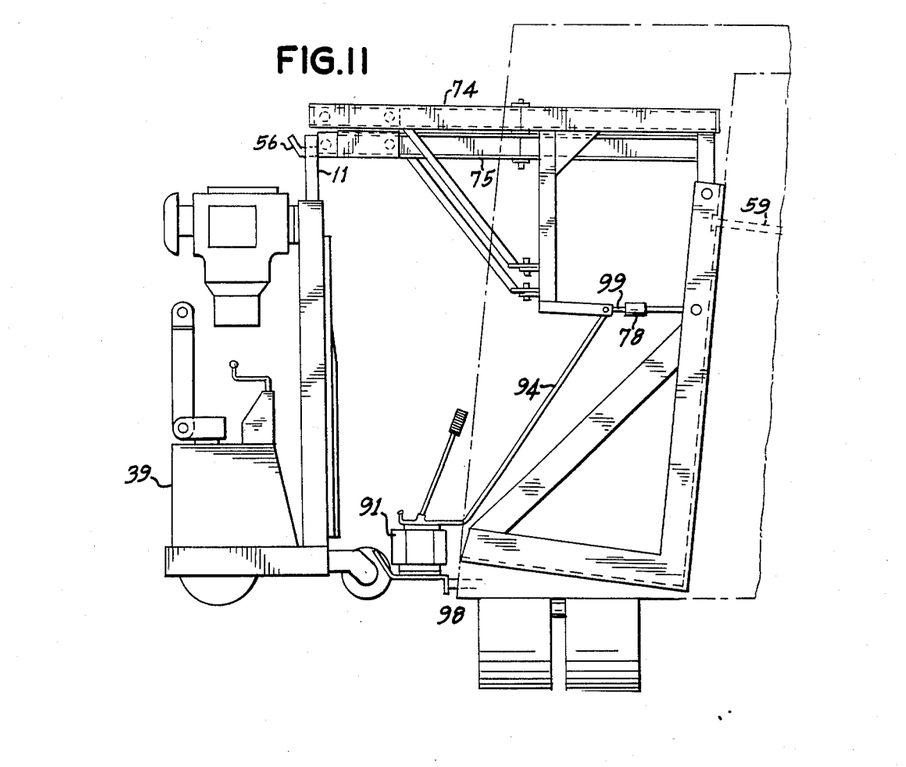
FIG. 11 is a side elevation view of the embodiment of FIG. 7 with the forklift, truck attached and raised off the ground.
Figure 12:
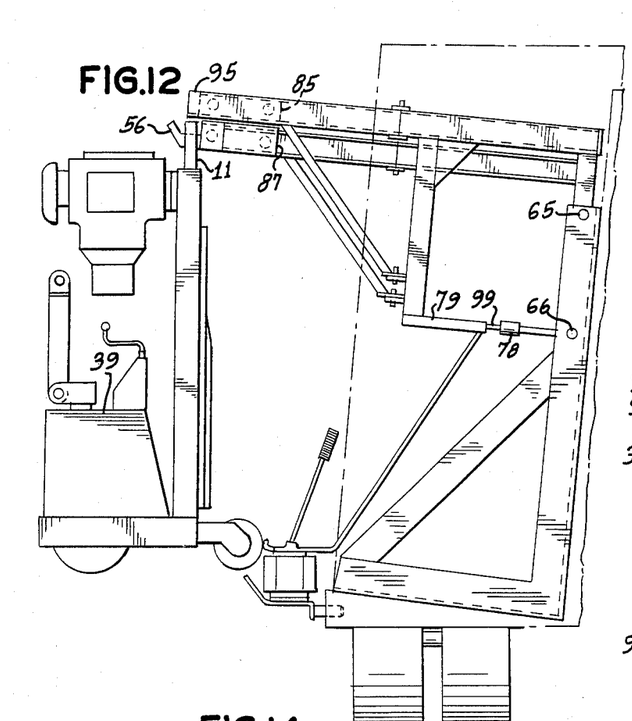
FIG. 12 is a side elevation view as in FIG. 11 with the hanger arms tilted upward.
Figure 13:
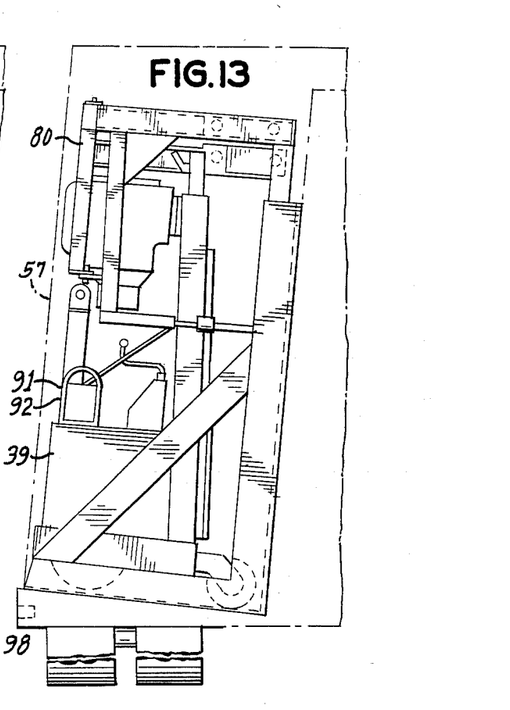
FIG. 13 is a side elevation view as in FIG. 12 with the forklift truck inside a bay of the highway truck.
Figure 14:
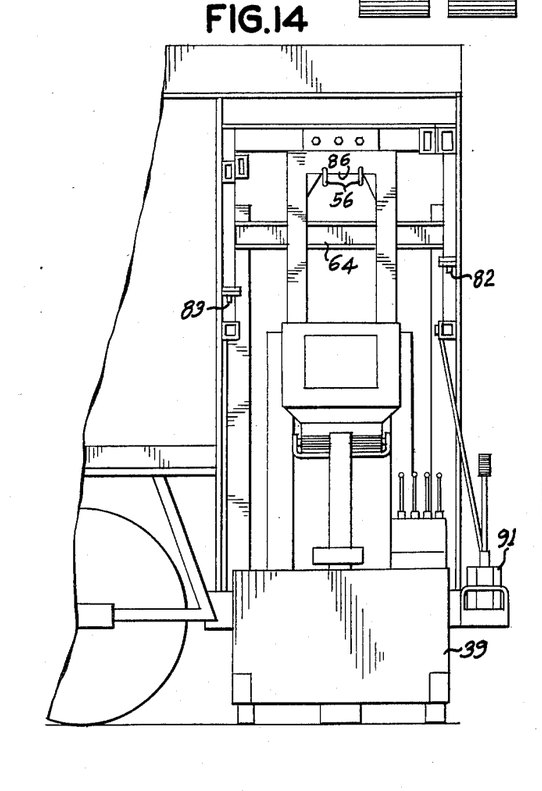
FIG. 14 is a front elevation of the view of FIG. 10 but with the mast of the forklift truck attached to the hooks on the storage framework.
Figure 15:
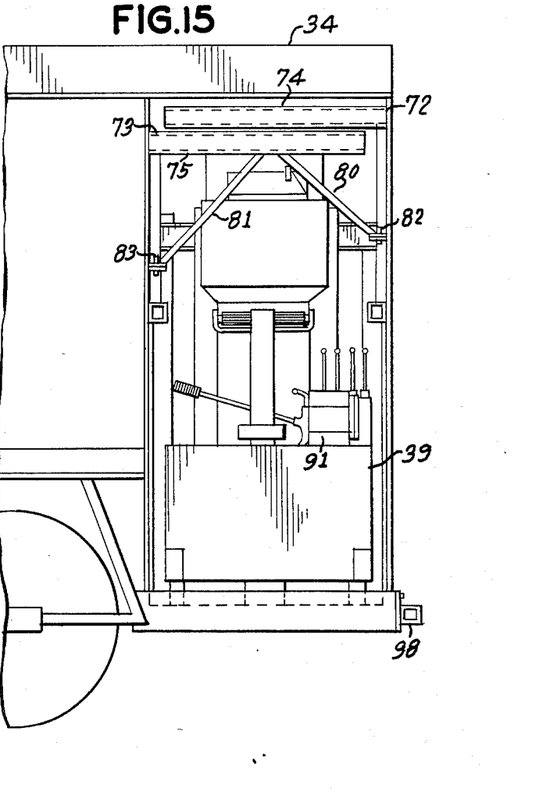
FIG. 15 is a front elevation view of the view of FIG. 13.
Figure 16:
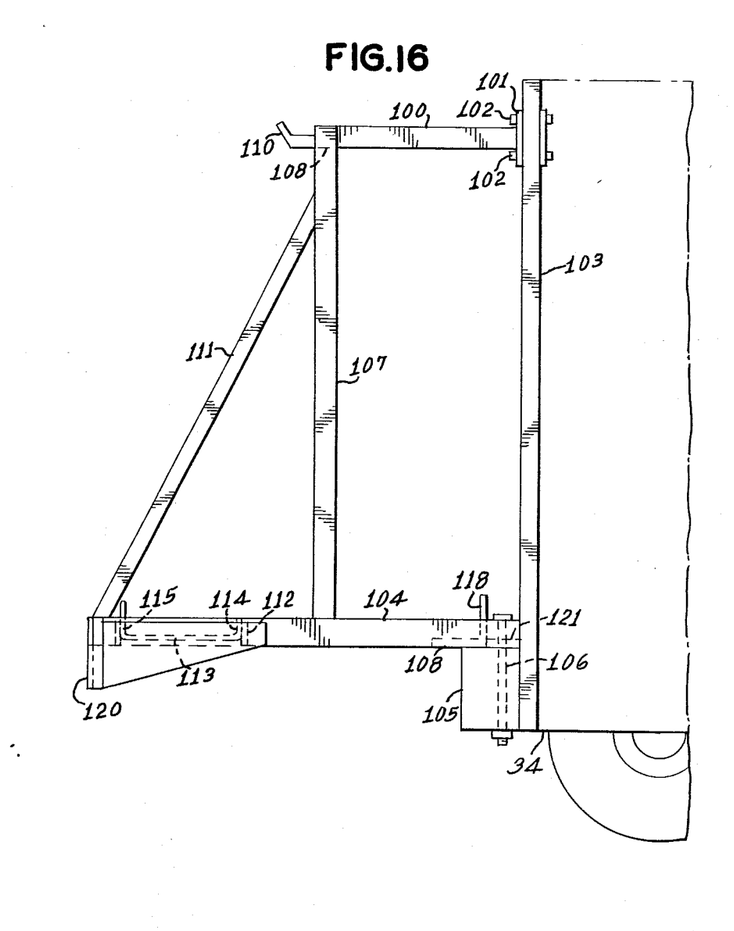
FIG. 16 is a side elevation view of another embodiment of the freight handling system of this invention.
Figure 17:
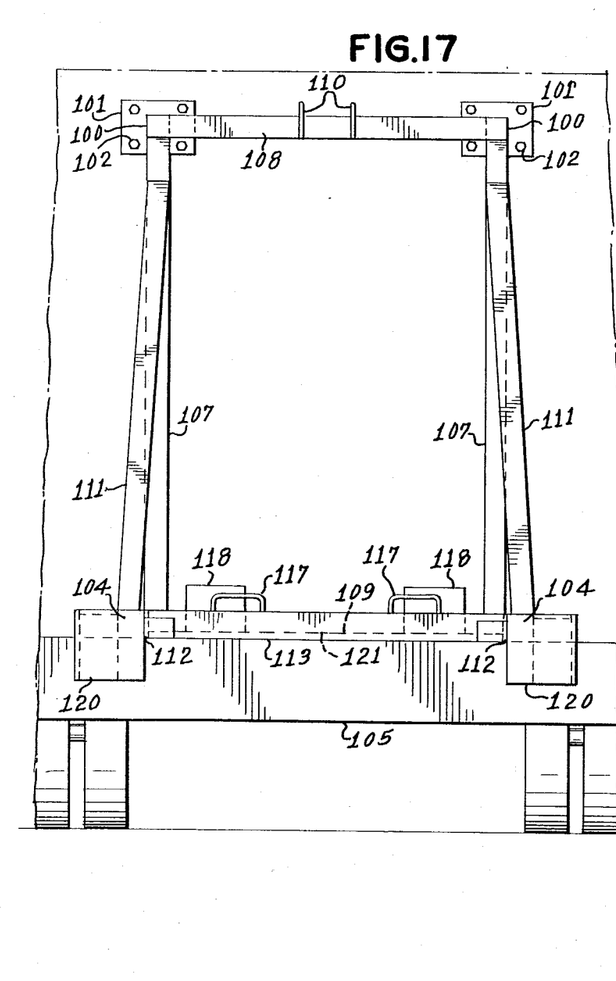
FIG. 17. is a front elevation view of the embodiment of FIG. 16.
Figure 18:
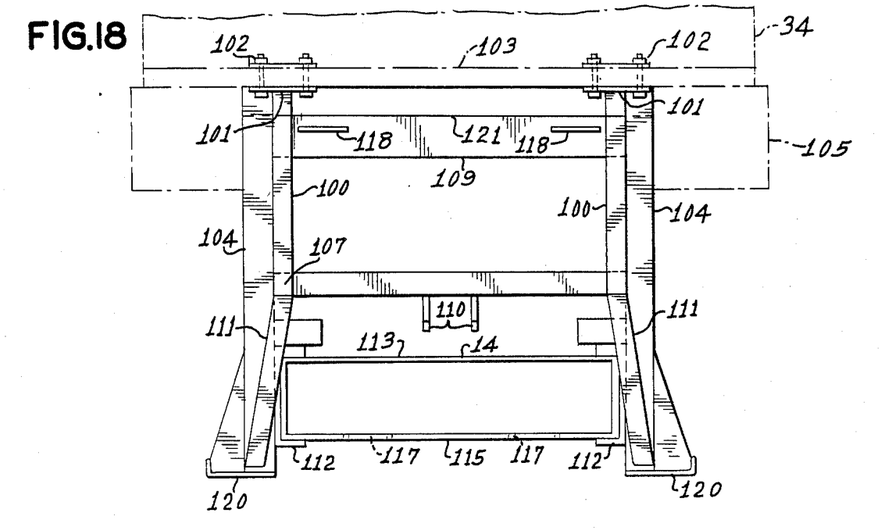
FIG. 18. is a top plan view of the embodiment of FIG. 16
Figure 19:
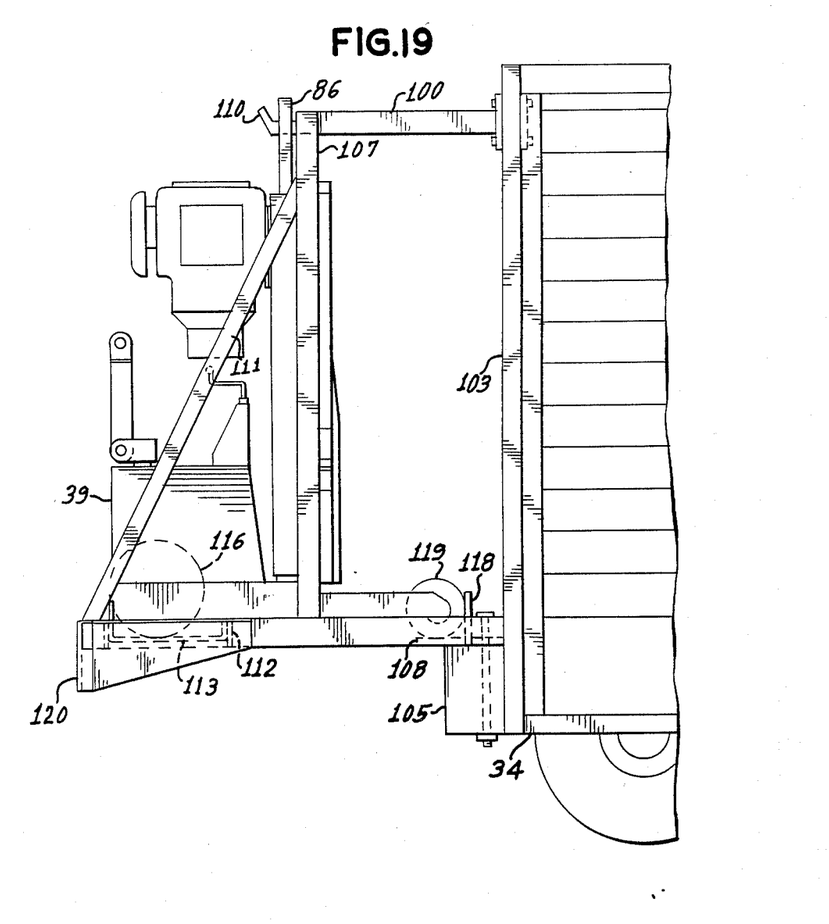
FIG. 19. is a side elevation view of the embodiment of FIG. 16 with the forklift truck of this invention stored thereon.
Figure 20:
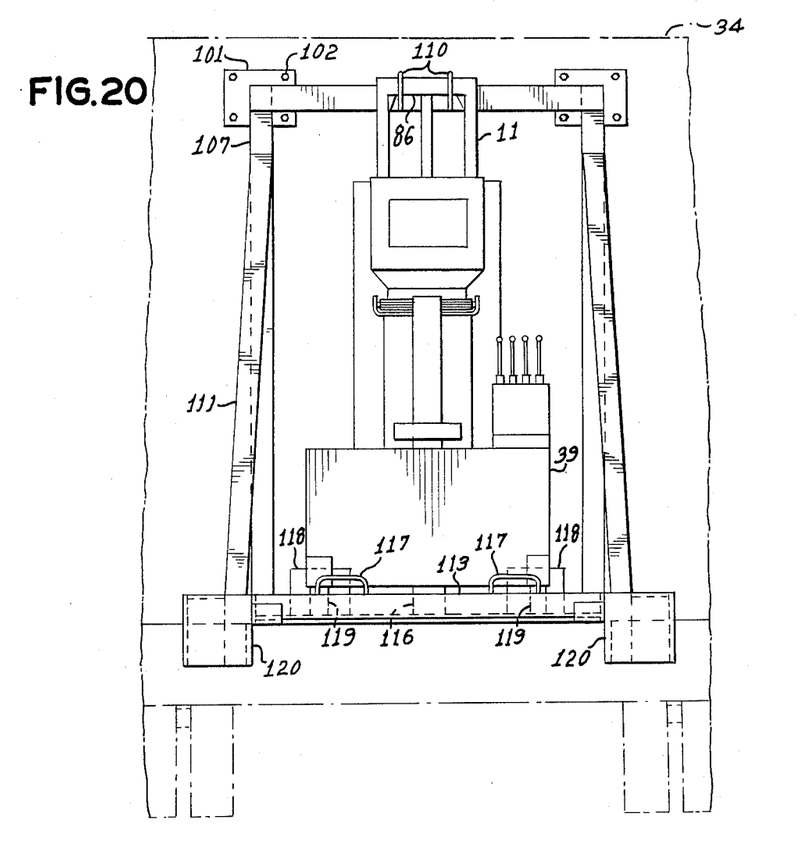
FIG. 20. is a front elevation view of the embodiment of FIG. 19.

The operation of this embodiment may best be seen in FIGS. 10-15. In FIG. 10 forklift truck 39 is driven toward the open bay 36 of delivery truck 34 which is fitted with the framework 55 and associated equipment just described with respect to FIGS. 7-9. Mast 11 is extended upward so that crossbar 86 may be positioned over hook means 56. The various foldable elements of truck 39 are then collapsed to the smallest extent possible except for mast 11. In FIG. 11 mast 11 is retracted so as to lift truck 39 off the ground, suspended on hook means 56. In FIG. 12 truck 39 has been lifted up to the level of the floor 61 of bay 36. Hydraulic pump 91 is then operated manually by its handle to apply pressure to hydraulic cylinder 78 causing it to extend its connecting rod 99 to push against extension arm 79. This causes movable framework 67 to pivot around pin 65 moving horizontal channels 68 and 69 upward to the position 95 from the original horizontal position. The tilting of channels 68 and 69 permits trolleys 85 and 87 and cross bar 84 (from which forklift truck hangs from hooks 56) to roll by gravity to the inside of bay 36 as shown in FIG. 13. FIG. 14 shows a front view of truck 39 inside of bay 36. In order to bring the outstretched arms 74 and 75 inside the outline 57 of truck 34, arms 74 and 75 and supports 80 and 81 are pivoted on hinges 72, 73, 82, and 83 to fold toward each other and assume the position shown both in FIGS. 13 and 15. Hydraulic pump 91 is removed from the back of track 34 by withdrawing pin connector 93 from socket 98 and placing pump 91 and saddle 92 inside bay 36 at any convenient location, e.g. on a horizontal surface of truck 39 as shown in FIGS. 13 and 15. Bay 36 preferably has a cover (not shown in these drawings) which closes bay 36 so as to keep dust and dirt out while truck 34 moves along the highways.

In FIGS. 16-20 there is illustrated another embodiment for storing the forklift truck of this invention on a highway delivery truck as it moves from delivery point to delivery point. In this embodiment a rigid framework and platform are attached to the rear wall of the delivery truck 24, and forklift truck 39 is raised onto that platform and retained there while truck 34 goes from place to place. The framework for this embodiment comprises two upper horizontal beams 100 each welded to a base plate 101 which is attached to the rear wall 103 of truck 34 by bolts 102. Two lower horizontal beams 104 are attached to the truck bumper 105 by bolts 106, and are welded to horizontal spacer beam 121 which also is bolted to bumper 105. Vertical beams 107 are welded to respective beams 100 and 104 to provide two sets of rigid framework tied together at the top by cross beam 108 and at the bottom by plate 109, all members of which are preferably joined by welding, although suitable connections by bolts and nuts are also operable. Hook means 110, preferably two hooks, are spaced apart to match the width of cross bar 86 of mast 11 of forklift truck 39 and are rigidly attached to cross beam 108. Stiffening members 111 are attached to form triangular portions with beams 104 and 107 to provide stiffening for the framework. Welded to beams 104 adjacent their outer ends are seat members 112 into which is seated removable support channel 113 having a forward upstanding lip 114 and a rearward upstanding lip 115. Channel member 113 is designed to support truck 39 by engaging rear wheels 116 between lips 114 and 115. Handles 117 are welded to rearward lip 115 to provide a means for manually lifting channel member out of or replacing it into seats 112 for reasons as will be explained below with referenc to FIGS. 19 and 20. For similar reasons in retaining truck 39 in its carried position stop members 118 are included as upstanding from plate 108 and are designed to engage the front of front wheels 119 of forklift truck 39. At the rearward ends of lower horizontal beams 104 there are preferably constructed bumper assemblies 120 which are large enough in area to function as the rear bumper of truck 34 and to house signal lights such as the brake light, back-up light, and turn signals. These features are not a part of this invention and, therefore, are not shown in the drawings.

The operation of this embodiment in storing and carrying the forklift truck 39 involves removing channel support member 113 and driving truck 39 forward between the two framework structures until mast 11 is below hook means 110. Mast 11 is raised until cross bar 86 is above hook means 111 and truck 39 is moved forward and mast 11 lowered to engage cross bar 86 onto hook means 111. Mast 11 is then retracted, causing truck 39 to lift itself off the ground and upward high enough for rear wheel 116 to be above the level of lips 114 and 115. Channel member 113 is then placed into seats 112 and truck 39 lowered until rear wheel 116 is engaged by and supported by channel member 113. At the same time as truck 39 is lowered onto channel member 113 front wheels 119 are extended to rest upon plate 109 and against stop members 118. Forklift truck 39 is then stored and ready to be carried wherever truck 34 may go. When truck 34 reaches its destination and forklift truck 39 is to be used, it can be removed from the storage structure by reversing the above operations.

Still another embodiment of this invention for storing and transporting the forklift truck of this invention is shown in FIGS. 21-25. In this embodiment the forklift truck is stored and transported on a wheeled trailer that is towed behind the highway truck carrying beverage or other goods. This embodiment includes a trailer framework of two horizontal longitudinal beams 122 and one transverse horizontal beam 123 welded into a rectangular structure. Two vertical beams 124 are positioned to be upstanding from horizontal beams 122 and connected to each other at the top by cross beam 125.

Figure 21:
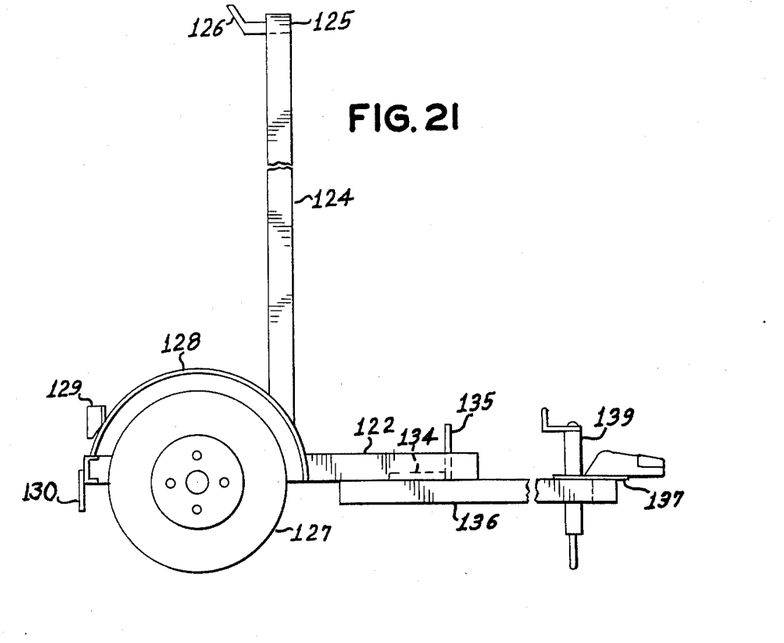
FIG. 21. is a side elevation view of still another embodiment of the freight handling system of this invention.
Figure 22:
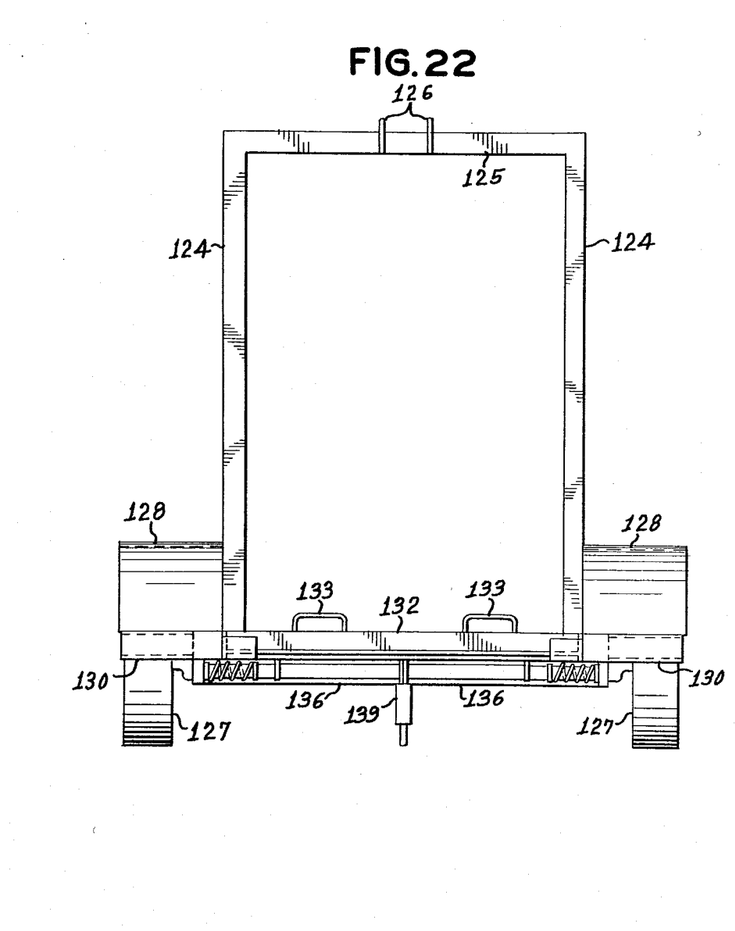
FIG. 22. is a front elevation view of the embodiment of FIG. 21.
Figure 23:
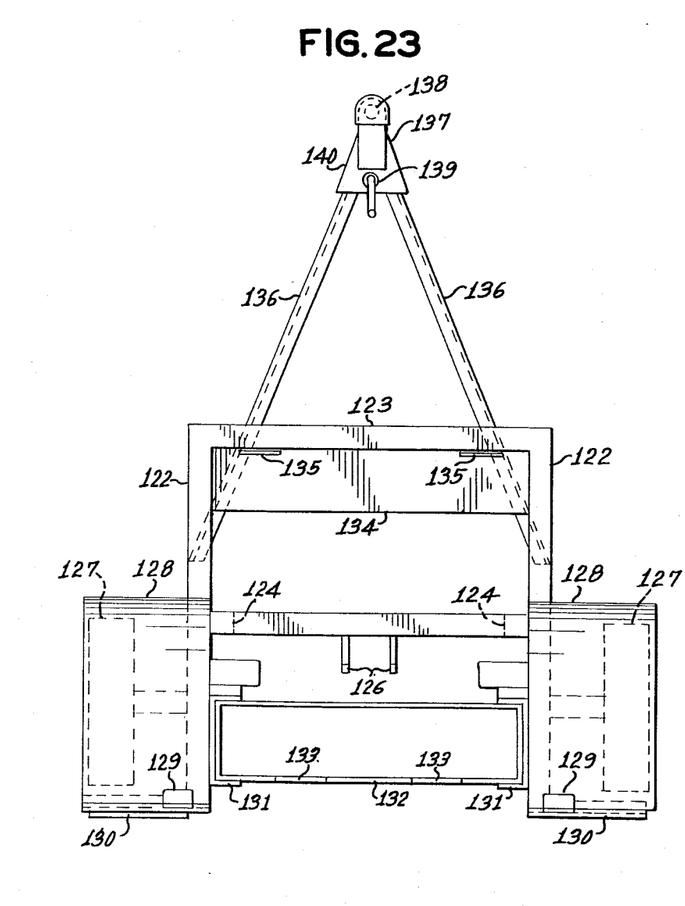
FIG. 23. is a top plan view of the embodiment of FIG. 21.
Figure 24:
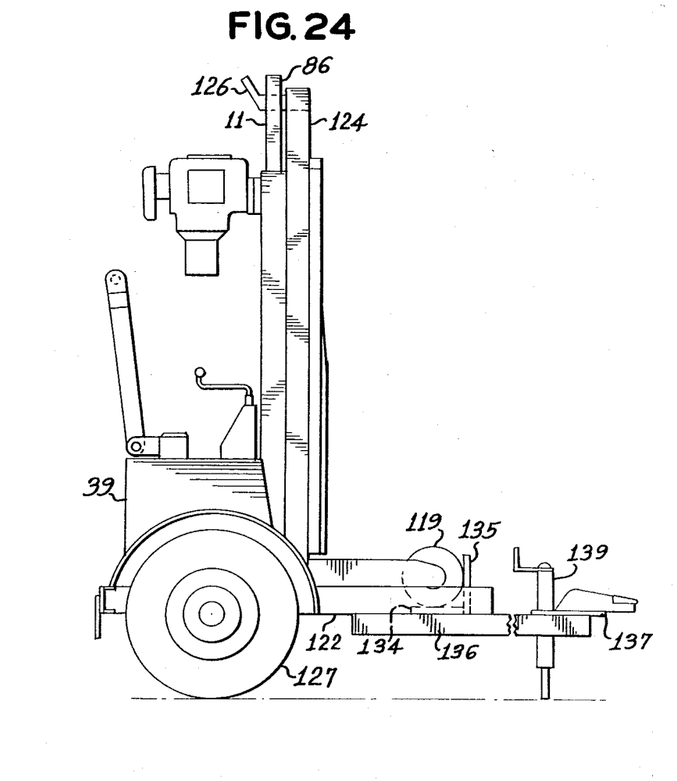
FIG. 24. is a side elevation view of the embodiment of FIG. 21 with the forklift truck of this invention stored thereon.
Figure 25:
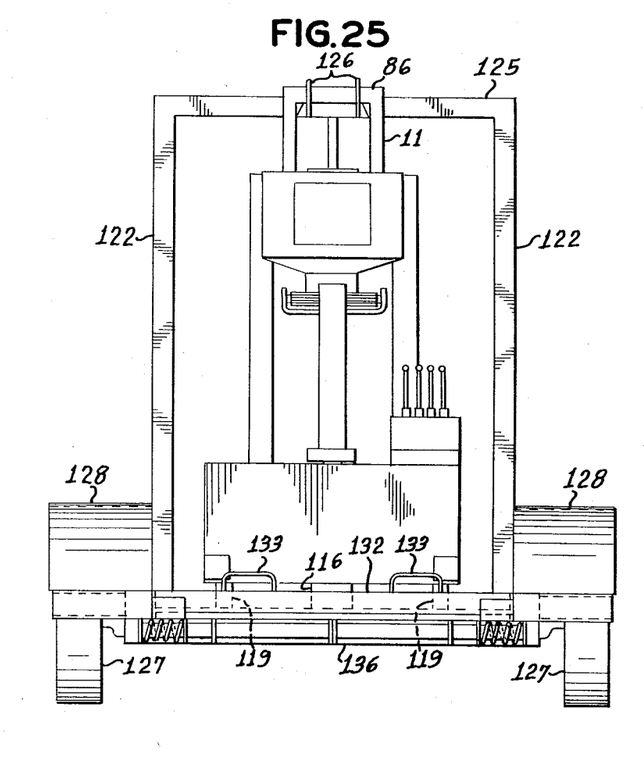
FIG. 25. is a front elevation view of the embodiment of FIG. 24

Hook means 126 are welded to cross beam 125 so as to be convenient for attachment to crossbar 86 on mast 11 of forklift truck 39. Preferably hook means 126 comprises two hooks spaced apart sufficiently to provide stable engagement with crossbar 86. Attached to the rearward portions of beams 122 are two automotive wheel assemblies 127 of axles, wheels, and tires by means of bearing journals, springs, etc. that are well known in the art and do not form a part of this invention. Fenders 128, signal light assemblies 129, and bumper 130 are also well known automotive equipment which preferably are included in this embodiment.

Affixed to beams 122 are seats 131 to receive channel support member 132 which is manually removable from seats 131. Handles 133 provide a convenient means for removing channel member 132 from or placing channel member 132 into seats 131. As will be explained below channel support 132 is removed from seats 131 when forklift truck 39 is to be moved from the ground into storage position, and is replaced in seats 131 when truck 39 is ready for storage. The front wheels 119 rest on plate 134 against stop members 135 when truck 39 is in the storage position. Plate 134 is affixed e.g. by welding, to beams 122.

Stringers 136 are welded to beams 122 at an angle so as to meet at a sufficient distance in front of transverse beam 123 to provide adequate space for highway truck 24 to turn without impeding the free movement of the trailer of this embodiment. Generally this means that the distance from transverse beam 123 to the trailer hitch is not less than about six feet. At the conjunction of stringers 136 there is affixed a conventional trailer hitch 137, including a socket 138, an adjustable jack stand 139, and a base structure 140 to which these features are attached.

The operation of this embodiment in storing and transporting forklift truck 39 is very similar to that described above with respect to the embodiment of FIGS. 16–20. Forklift truck 39 is driven forward between the wheel assemblies 127 after removing channel support 132 from seats 131. Mast 11 is raised so that cross bar 86 can pass over the open end of hook means 126. Mast 11 is then retracted causing forklift truck 38 to lift itself off the ground to a level such that channel support 132 can be placed into seats 131, permitting truck 39 to lower its rear wheel 116 into channel support 132. At the same time front wheels 119 are extended forward so that they will rest on plate 134 against stop members 135. In this posittion truck 39 is secured for storage while being transported to another location by highway truck 34 pulling behind it the trailer of this embodiment.

While the invention has been described and with respect to certain specific embodiments, it will be appreciated that many modifications and changes may be made by those skilled in the art without departing from the spirit of the invention. It is intended therefore, by the appended claims to cover all such modifications and changes as fall within the true spirit and scope of the invention.

What is claimed as new and what is desired to be secured by Letters Patent of the United States is:

1. A freight transport system comprising a highway transport truck for transporting interiorly thereof a driver, packaged freight, and a self-propelled freight handling forklift truck for transporting said freight from said highway transport truck to a delivery destination, said highway transport truck including means for transporting said self-propelled forklift truck in a collasped condition, said self-propelled forklift truck including a frame having a pair of parallel vertical rails, wheels mounted on said frame for transporting said truck, lifting forks mounted on said rails to move upwards and downwards and selectively to be collapsible against said rails, internal combustion power means for generating power to propel said truck and to raise, lower, and tilt said lifting forks, at least one of said wheels being a driving wheel rotated by said power means, two horizontally pivoted legs with a freely rotating wheel at the forward end of each leg telescopically attached to extend or retract longitudinally from each leg, hydraulic power means to pivot said legs and to extend or retract said wheels, and a tiller guiding means attached to said driving wheel for manually guiding said truck, said tiller being selectively collapsible by folding against said frame.

2. The system of claim 1 wherein said forklift truck propels itself on at least three wheels, one of which is a driving wheel directly connected to said power means, and the other two of which are unpowered driven wheels separately and respectively mounted on two legs which are pivotable by said power means to spread apart or be closed upon each other and are telescopically extendable or retractable by said power means.

3. The system of claim 1 wherein said power means includes pressurized hydraulic fluid in cylinders containing pistons movable by said fluid.

4. The system of claim 1 wherein said forklift truck is manually guidable by a tiller arm containing a rotatable hand grip adapted to control the power transmission to a driven wheel to selectively provide forward or reverse movement or braking to said truck.

5. The system of claim 1 which includes a selectively employable clamping surface against which said lifting forks can clamp materials supported on said forks.

6. The system of claim 1 wherein said means for transporting includes a wheeled trailer adapted to be towed behind said highway transport truck and having means for said forklift truck to lift itself from the ground to said trailer and to lower itself from the trailer to the ground.

7. The system of claim 6 wherein said means for said forklift truck includes a fixed hook member on said trailer attachable to the mast of said forklift truck such than said forklift truck may lift itself from the ground to said trailer and lower itself from said trailer to the ground.

8. The system of claim 6 wherein said trailer includes a manually removable support for the rear wheel or wheels of said forklift truck.

9. The system of claim 1 wherein said means for transporting includes a framework mounted in an interior bay of said highway transport truck, said framework having a hook member adapted to be attached to the mast of said forklift truck whereby said forklift truck can be lifted from the ground into said bay and may be lowered from the bay to the ground, said interior bay enclosing said forklift truck in its collapsed condition.

10. The system of claim 9 wherein said framework includes foldable extension arms and a cross member movably mounted on said arms by rollers and carrying said hook member.

11. The system of claim 10 wherein said extension arms are pivotably mounted to be adjusted to any position from slightly tilted above the horizontal to slightly tilted below the horiztontal.

12. The system of claim 1 wherein said means for transporting includes a framework mounted on the outside of the rear wall of said highway transport truck, said framework having a fixed hook member adapted to be engaged by the mast of said forklift truck which is capable of lifting itself from the ground to a support on said framework and lowering itself from said support to the ground.

13. The system of claim 12 wherein said framework includes a manually removable support for the rear wheel or wheels of said forklift truck.

* * * * *